United States Patent
Baron

(10) Patent No.: US 9,841,985 B2
(45) Date of Patent: Dec. 12, 2017

(54) STORAGE BLOCK DEALLOCATION IN VIRTUAL ENVIRONMENTS

(75) Inventor: Ayal Baron, Kiryat Ono (IL)

(73) Assignee: Red Hat Israel, Ltd., Raanana (IL)

( * ) Notice: Subject to any disclaimer, the term of this patent is extended or adjusted under 35 U.S.C. 154(b) by 473 days.

(21) Appl. No.: 13/084,915

(22) Filed: Apr. 12, 2011

(65) Prior Publication Data

US 2012/0265920 A1 Oct. 18, 2012

(51) Int. Cl.
*G06F 12/02* (2006.01)
*G06F 9/455* (2006.01)

(52) U.S. Cl.
CPC ...... *G06F 9/45558* (2013.01); *G06F 12/0253* (2013.01); *G06F 2009/45579* (2013.01)

(58) Field of Classification Search
CPC ............ G06F 9/45537; G06F 9/45558; G06F 9/5016; G06F 2009/45579; G06F 9/5077; G06F 12/08; G06F 12/1081; G06F 13/102; G06F 12/00; G06F 12/0253
USPC ..... 711/170, 6, 718, 710, E12.002, E12.001, 711/E12.016, 203
See application file for complete search history.

(56) References Cited

U.S. PATENT DOCUMENTS

| | | | |
|---|---|---|---|
| 8,468,535 B1* | 6/2013 | Keagy et al. | 718/104 |
| 2006/0149899 A1* | 7/2006 | Zimmer | G06F 3/0607 711/112 |
| 2008/0133709 A1* | 6/2008 | Aloni | G06F 13/102 709/218 |
| 2009/0320011 A1* | 12/2009 | Chow | G06F 11/3612 717/154 |
| 2010/0191929 A1* | 7/2010 | Rawson, III | 711/170 |
| 2010/0241785 A1* | 9/2010 | Chen et al. | 711/6 |
| 2010/0241820 A1* | 9/2010 | Pelts | G06F 3/0608 711/170 |
| 2010/0257331 A1* | 10/2010 | Frank | G06F 9/5022 711/166 |
| 2010/0306849 A1* | 12/2010 | Zheng et al. | 726/24 |
| 2011/0145511 A1* | 6/2011 | Woffinden | G06F 12/0808 711/141 |
| 2011/0179082 A1* | 7/2011 | Vaghani et al. | 707/781 |
| 2011/0179417 A1* | 7/2011 | Inakoshi | 718/1 |
| 2011/0265083 A1* | 10/2011 | Davis | 718/1 |
| 2012/0109897 A1* | 5/2012 | Janakiraman et al. | 707/660 |

(Continued)

OTHER PUBLICATIONS

Jones, M. T., "Virtio: An I/O Virtualization Framework for Linux", http://www.ibm.com/developerworks/linux/library/l-virtio/index.html?ca=dgr-lnxw07Viriodth-LX&S_TACT=105AGX59&S_CMP=grlnxw07, Printed from Internet on Apr. 11, 2011, (Jan. 29, 2010), pp. 1-7.

*Primary Examiner* — Mark Giardino, Jr.
*Assistant Examiner* — Edward Waddy, Jr.
(74) *Attorney, Agent, or Firm* — Lowenstein Sandler LLP

(57) ABSTRACT

A system and method deallocates data blocks in virtual environments with high efficiency. A computer system hosting a virtual machine includes an I/O device driver in the guest operating system of the virtual machine. The I/O device driver intercepts an operation performed by the guest operating system that causes a data block to be deallocated in the virtual machine. The I/O device driver informs a hypervisor of the computer system that the data block is to be deallocated. The hypervisor then instructs the data storage to deallocate the data block for reuse.

14 Claims, 4 Drawing Sheets

(56) References Cited

U.S. PATENT DOCUMENTS

| | | | |
|---|---|---|---|
| 2012/0167080 A1* | 6/2012 | Vilayannur | G06F 3/0608 718/1 |
| 2012/0174097 A1* | 7/2012 | Levin | 718/1 |
| 2012/0198440 A1* | 8/2012 | Shah | G06F 9/45558 718/1 |
| 2012/0233434 A1* | 9/2012 | Starks et al. | 711/170 |

* cited by examiner

STORAGE BLOCK DEALLOCATION IN VIRTUAL ENVIRONMENTS

TECHNICAL FIELD

Embodiments of the present invention relate to a computer system that hosts virtual machines, and more specifically, to storage allocation in a virtual machine system.

BACKGROUND

Efficient storage allocation is critical to the performance of a virtual machine system. In any file system, files are frequently created, modified and deleted. When adding data to files, storage blocks have to be allocated. In order to save resources, storage can be allocated on a need-to-use basis, a method sometimes referred to as thin provisioning. In file systems, files allocated in such a manner are referred to as sparse files. When a write operation is performed to a sparse file, blocks are allocated to store the added data.

Virtual machine "hard drives" are implemented via a file or a block device, and is usually referred to as an "image." Conventionally, image files tend to unnecessarily inflate in volume. This is because the data blocks of an image file deleted by a virtual machine cannot be easily reused by the host of the virtual machine. The backing disk storage is unaware of the file deletion that happens in the VM. Thus, in a conventional virtual machine system, the size of the images can continue to grow, thereby eliminating a major benefit of using thin provisioning.

One conventional approach uses a utility in the virtual machine that periodically writes zeros to deallocated blocks. The hypervisor of the virtual machine system "catches" these write operations, and detects that the written blocks are zeros. The hypervisor then redirects the blocks to point to a "zero" block, which is linked to the written blocks. All of the written blocks that are linked to the "zero" block are freed and can be reused. With this approach, free blocks are regained only periodically and image files can still inflate in the interim. Further, the hypervisor needs to check all of the written blocks and compare those blocks to zero. The checking and comparing operations are not efficient and, as a result, reduce the performance of the system.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for block deallocation in virtual environments with high efficiency. In one embodiment, a computer system hosting a virtual machine includes an I/O device driver in the guest operating system of the virtual machine. The I/O device driver intercepts an operation performed by the guest operating system that causes a data block to be deallocated in the virtual machine. The I/O device driver informs a hypervisor of the computer system that the data block is to be deallocated. The hypervisor then instructs the data storage to deallocate the data block for reuse.

Embodiments of the present invention utilize a paravirtualized mechanism to deallocate a data block in the data storage. The guest operating system communicates with the hypervisor regarding block deallocation via an I/O device driver in the guest operating system and a corresponding backend device driver in the hypervisor. Operations that cause block deallocation are intercepted as they take place, and the hypervisor is informed of the block deallocation right away. As a result, the data blocks that are deallocated in a virtual machine can also be deallocated (i.e., "freed") in the data storage for reuse without delay.

The term "data block" (also referred to as "block") hereinafter refers to a basic unit of data storage. A block may be addressed by a guest operating system using a logical block address, and can also be addressed by a hypervisor, a host operating system, or a data storage (e.g., disks) using a physical block address. A block addressed by a logical block address can be referred to as a "logical block," and a block addressed by a physical block address can be referred to as a "physical block."

In the following description, numerous details are set forth. It will be apparent to one skilled in the art, however, that the present invention may be practiced without these specific details. In some instances, well-known structures and devices are shown in block diagram form, rather than in detail, in order to avoid obscuring the present invention.

Figure 1:
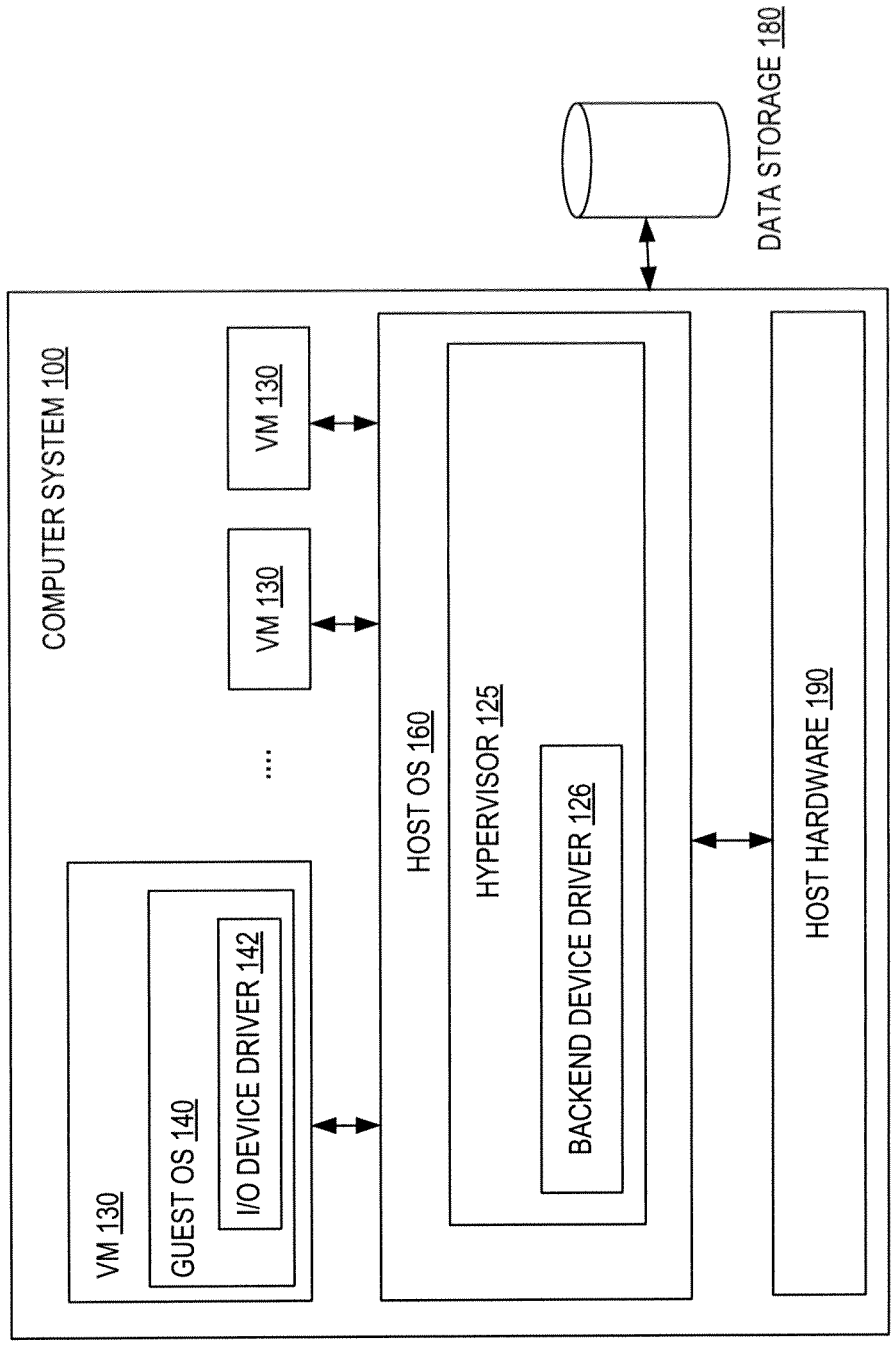
FIG. 1 is a block diagram illustrating one embodiment of a virtualized computer system that hosts virtual machines.

FIG. 1 is a block diagram that illustrates an embodiment of a computer system 100 that hosts a plurality of virtual machines (VM) 130. Each virtual machine 130 runs a guest operating system (OS) 140. The virtual machines 130 may have the same or different guest operating systems 140, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

The computer system 100 also runs a host OS 160 to manage system resources. In one embodiment, the computer system 100 runs a hypervisor 125 to emulate underlying host hardware 190, making the use of the virtual machine 130 transparent to the guest OS 140 and the user of the computer system 100. The hypervisor 125 may also be known as a virtual machine monitor (VMM) or a kernel-based hypervisor. In some embodiments, the hypervisor 125 may be part of the host OS 160.

The computer system 100 also includes one or more physical central processing units (CPUs), memory, I/O devices and other hardware components. The computer system 100 may also be coupled to a data storage 180, which may include mass storage devices, such as magnetic or optical storage based disks, tapes or hard drives.

According to one embodiment of the present invention, the computer system 100 implements a paravirtualization scheme for data block deallocation. Before further describing data block deallocation, some concepts relating to paravirtualization are explained as follows. In a paravirtualization environment, the guest OS is aware that it is running on a hypervisor and includes code to make guest-to-hypervisor transitions more efficient. By contrast, in full virtualization, the guest OS is unaware that it is being virtualized and can work with the hypervisor without any modification to the guest OS. The hypervisor in full virtualization traps device access requests from the guest OS, and emulates the behaviors of physical hardware devices. However, without the help of the guest OS, emulation in full virtualization can be much more complicated and inefficient than emulation in paravirtualization.

In one embodiment, the computer system 100 implements paravirtualization by including an I/O device driver 142 (also referred to as "guest I/O device driver") in each guest OS 140 and a corresponding backend device driver 126 in the hypervisor 125. The I/O device driver 142 communicates with the backend device driver 126 regarding the deallocation of data blocks in the data storage 180. By having the device drivers 142 and 126, the guest OS 140 can provide information to the hypervisor 125 as a data deallocation operation takes place, without having the hypervisor 125 trap every device access request from the pest OS 140. The I/O device driver 142 and the backend device driver 126 may reside in the memory or the data storage 180 accessible by the computer system 100.

Figure 2:
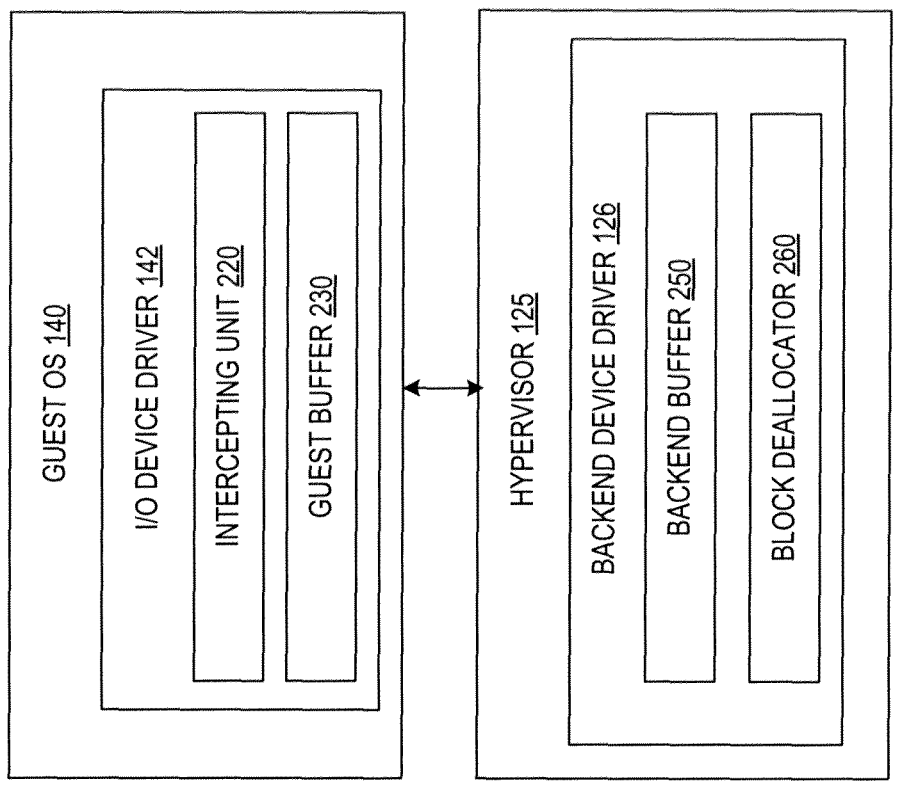
FIG. 2 is a block diagram illustrating one embodiment of an I/O device driver in a guest operating system.

FIG. 2 illustrates an embodiment of the I/O device driver 142 in the guest OS 142 and the corresponding backend device driver 126 in the hypervisor 125. In one embodiment, the I/O device driver 142 includes an intercepting unit 220 to intercept operations performed by the guest OS 140, where the operations cause a logical block to be deallocated in the virtual machine 130. For example, the intercepting unit 220 may intercept a file delete operation that causes logical blocks used by the deleted file to be deallocated in the virtual machine 130. Additionally, the intercepting unit 220 may intercept defragmentation operations performed by the guest OS 140, or other operations that can result in the deallocation of data blocks in the virtual machine 130. When a logical block is deallocated in the virtual machine 130, the block is marked by the guest OS 140 as unused but the actual content of the block in the data storage 180 is not yet erased. The host OS 160 is not yet aware that the block can be reused. To communicate with the hypervisor 125 regarding the block deallocation, the I/O device driver 142 includes a guest buffer 230 for storing outbound data to be sent to the hypervisor 125, and inbound data sent from the hypervisor 125. The corresponding backend device driver 126 includes a backend buffer 250 to buffer data to and from the guest I/O device driver 142, and a block deallocator 260 to instruct and communicate with the data storage 180 regarding the deallocation of the corresponding physical block in the data storage 180. Once a physical block is deallocated, it is free for reuse by the computer system 100.

In one embodiment, the I/O device driver 142 and the backend device driver 126 use the Virtual I/O (VIRTIO) application programming interface (API) to communicate with the hypervisor 125. The VIRTIO API is a standardized interface originally developed for the Linux® kernel. The VIRTIO API defines a protocol that allows a guest OS 140 to communicate with the hypervisor 120, utilizing paravirtualization to facilitate device emulation with increased efficiency. Although VIRTIO is described herein, it is understood that other interfaces can also be used.

Figure 3:
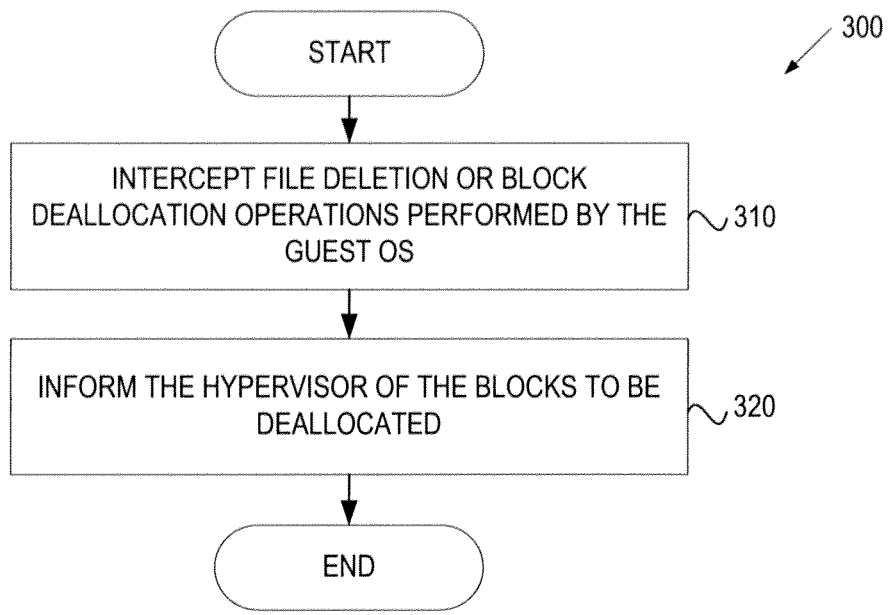
FIG. 3 is a flow diagram illustrating a method of a guest I/O device driver to deallocate data blocks in accordance with one embodiment of the present invention.

FIG. 3 is a flow diagram illustrating one embodiment of a method 300 for a guest I/O device driver to deallocate blocks. The method 300 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 300 is performed by the I/O device driver 142 in the guest OS 140 of FIGS. 1 and 2.

Referring to FIG. 3, in one embodiment, the method 300 begins when an operation performed by the guest OS 140 causes a logical block to be deallocated (e.g., a file deletion operation or any block deallocation operation). The I/O device driver 142 intercepts the operation (block 310). The I/O device driver 142 then informs the hypervisor 125 of the operation (block 320). In one embodiment, the I/O device driver 142 may send a command to the hypervisor 125 via the VIRTIO API, including the address of the base logical block address and the number of blocks to be released. In one embodiment, the command may be a TRIM command, as specified in the AT Attachment (ATA) interface standard. In some embodiments, the TRIM command may be implemented by a Small Computer System Interface (SCSI) WRITE_SAME(16) command with the UNMAP bit set. The WRITE_SAME (16) command allows an operating system to inform a disk drive (or an "emulated" disk drive emulated by a hypervisor) that the physical blocks currently mapped to the logical blocks specified in the command can now be unmapped. Once a physical block is unmapped, its content can be erased internally and it is freed for reuse. It is understood that a different command may also be used to deallocate a data block in the data storage.

Figure 4:
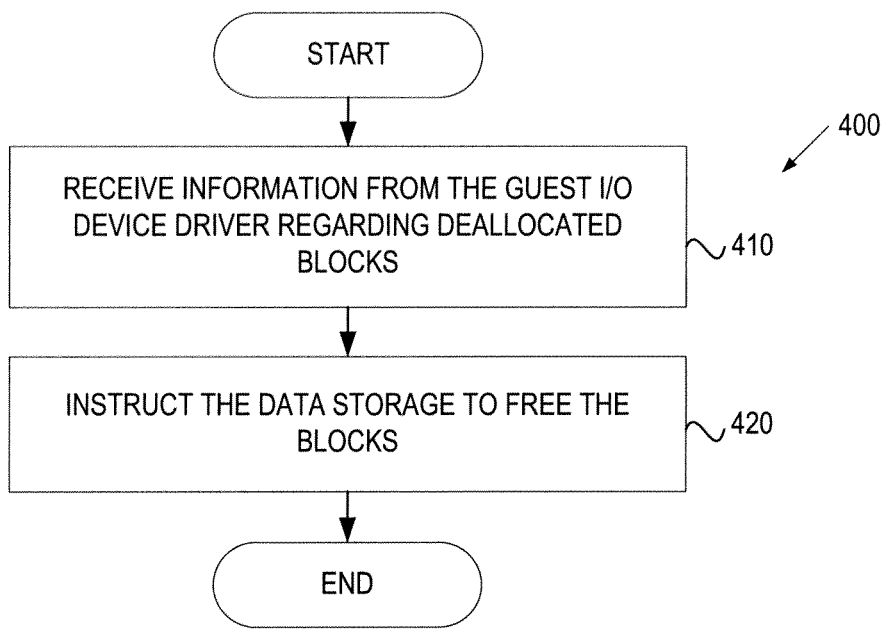
FIG. 4 is a flow diagram illustrating a method of a backend device driver in a hypervisor to deallocate data blocks in accordance with one embodiment of the present invention.

FIG. 4 is a flow diagram illustrating one embodiment of a method 400 for a backend device driver in a hypervisor to deallocate data blocks. The method 400 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 400 is performed by the backend device driver 126 in the hypervisor 125 of FIGS. 1 and 2.

Referring to FIG. 4, in one embodiment, the method 400 begins when the backend device driver 126 receives information (e.g., a WRITE_SAME(16) command, with accompanying block identifying information) from the guest I/O device driver 142 (block 410). In one embodiment, the backend device driver 126 may store the received information in the backend buffer 240, and retrieve the information from the backend buffer 240 at an appropriate time. The information may include a command that indicates a range of logical blocks which have been deallocated by the guest OS 140. In response to the information, the backend device driver 126 translates the logical data address passed from the guest OS 140 into a corresponding physical block address, and either instructs the data storage 180 to deallocate (i.e., free) the physical blocks (block 420) or keeps track of such blocks for future reuse. The method 400 then terminates. After the physical blocks are freed, the physical blocks can be reused by the computer system 100 and can be reallocated to the same or a different guest OS 140 that runs on the computer system 100.

Figure 5:
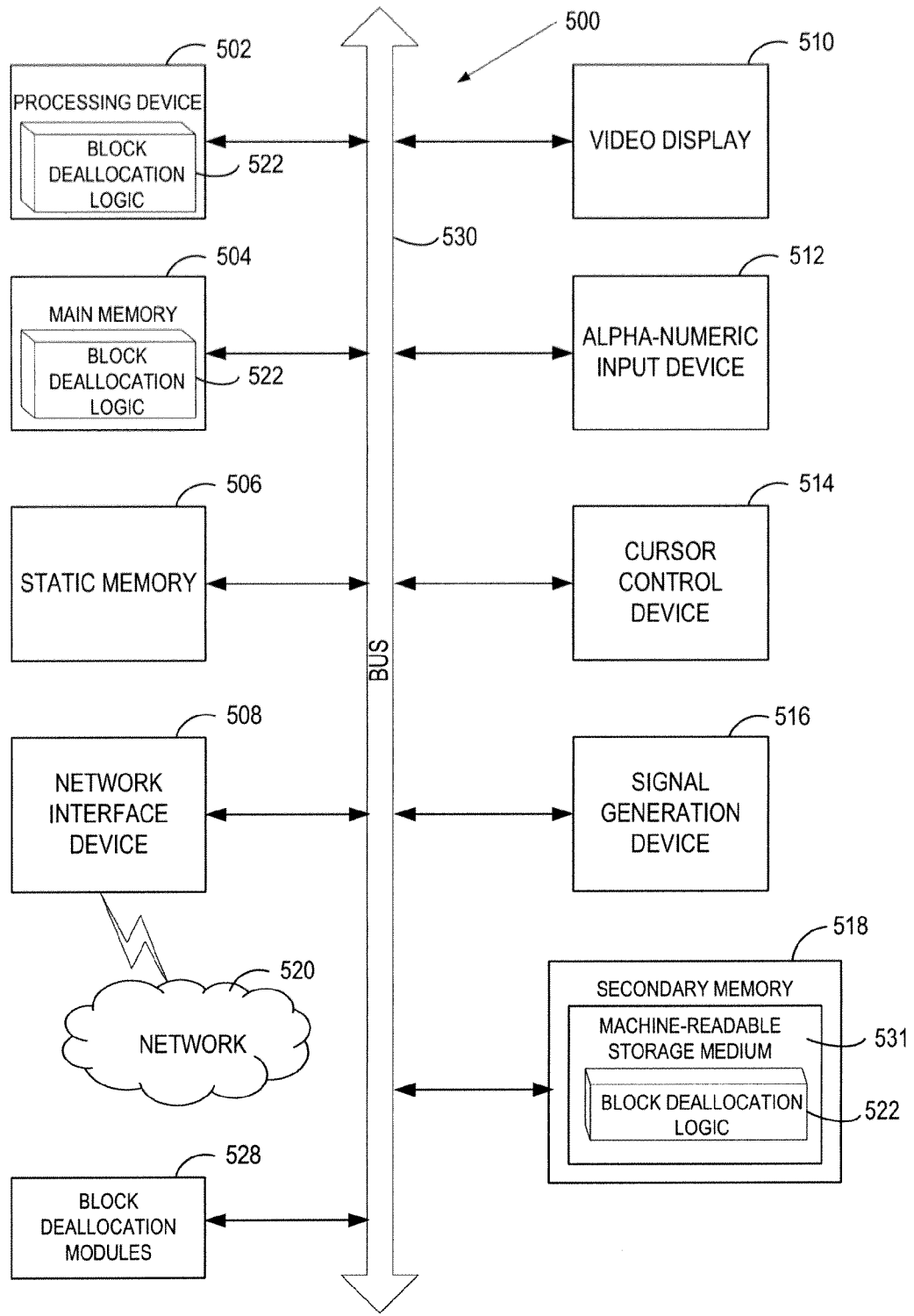
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a proc sing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute block deallocation logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or, more specifically, a computer-readable storage medium) 531 on which is stored one or more sets of instructions (e.g., block deallocation logic 522) embodying any one or more of the methodologies or functions described herein (e.g., the I/O device driver 142 and/or the backend device driver 126 of FIGS. 1 and 2). The block deallocation logic 522 may also reside, completely or at least partially, within the main memory 504 and/or within the processing device 502 during execution thereof by the computer system 500, the main memory 504 and the processing device 502 also constituting machine-readable storage media. The block deallocation logic 522 may further be transmitted or received over a network 520 via the network interface device 508.

The machine-readable storage medium 531 may also be used to store the block deallocation logic 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 500 may additionally include block deallocation modules 528 for implementing the functionalities of the I/O device driver 142 and/or the backend device driver 126 of FIGS. 1 and 2. The module 528, components and other features described herein (for example, in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "intercepting", "informing", "instructing", "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   intercepting, by a processing device executing an input/output (I/O) device driver of a guest operating system of a virtual machine hosted by a computer system, a file deletion operation performed by the guest operating system, wherein the file deletion operation causes a data block to be deallocated in the virtual machine;
   sending, by the processing device executing the I/O device driver in response to the intercepting, information to a hypervisor of the computer system, the information identifying the file deletion operation and comprising a logical address of the data block to be deallocated, wherein a logical block associated with the data block is deallocated, without erasing content of the data block;
   storing, by a buffer associated with a backend driver of the hypervisor, the information identifying the logical address of the data block to be deallocated; and
   performing, by the backend device driver of the hypervisor, at least one of instructing a data storage that stores the data block to deallocate the data block for reuse or tracking the data block for reuse.

2. The method of claim 1, further comprising communicating from the guest operating system to the hypervisor using paravirtualization.

3. The method of claim 1, further comprising sending a command comprising a number of data blocks to be deallocated to the hypervisor.

4. The method of claim 1, further comprising sending a command to unmap a physical block in the data storage, the physical block currently being mapped to the data block.

5. The method of claim 1, further comprising sending a write_same command with an unmap bit set to the hypervisor.

6. The method of claim 1, further comprising communicating from the guest operating system to the hypervisor through a VIRTIO API.

7. A system comprising:
   data storage to store a data block; and
   a processing device operatively coupled to the data storage to host a virtual machine, wherein a guest operating system of the virtual machine comprises an input/output (I/O) device driver executable by the processing device to:
   intercept a file deletion operation performed by the guest operating system, wherein the file deletion operation causes a data block to be deallocated in the virtual machine;
   send, in response to the file deletion operation being intercepted, information to a hypervisor of the computer system, the information identifying the file deletion operation and comprising a logical address of the data block is to be deallocated, wherein a logical block associated with the data block is deallocated, without erasing content of the data block;
   store, by a buffer associated with a backend driver of the hypervisor, the information identifying the logical address of the data block to be deallocated; and
   perform, by the backend device driver of the hypervisor, at least one of instructing the data storage that stores the data block to deallocate the data block for reuse or tracking the data block for reuse.

8. The system of claim 7, the processing device to receive additional information about the data block from the I/O device driver.

9. The system of claim 8, wherein the additional information comprises at least one of a command or a number of data blocks to be deallocated.

10. The system of claim 8, wherein the additional information further comprises: a command to unmap a physical block in the data storage, wherein the physical block is currently mapped to the data block.

11. A non-transitory computer readable storage medium comprising instructions that, when executed by a processing device, cause the processing device to:
   intercept, by the processing device executing an input/output (I/O) device driver of a guest operating system of a virtual machine hosted by a computer system, a file deletion operation performed by the guest operating system, wherein the file deletion operation causes a data block to be deallocated in the virtual machine;
   send, in response to the file deletion operation being intercepted by the I/O device driver, information to a hypervisor of the computer system, the information identifying the file deletion operation and comprising a logical address of the data block to be deallocated, wherein a logical block associated with the data block is deallocated, without erasing content of the data block;
   store, by a buffer associated with a backend driver of the hypervisor, the information identifying the logical address of the data block to be deallocated; and
   perform, by the backend device driver of the hypervisor, at least one of instructing a physical data storage that stores the data block to deallocate the data block for reuse or tracking the data block for reuse.

12. The non-transitory computer readable storage medium of claim 11, the guest operating system and the hypervisor to communicate using paravirtualization.

13. The non-transitory computer readable storage medium of claim 11, the processing device to send a number of data blocks to be deallocated to the hypervisor.

14. The non-transitory computer readable storage medium of claim 11, the processing device to send a command to unmap a physical block in the data storage, the physical block currently being mapped to the data block.

* * * * *